United States Patent
Lee et al.

(10) Patent No.: US 7,633,489 B2
(45) Date of Patent: Dec. 15, 2009

(54) NAVIGATION SYSTEM AND NAVIGATION METHOD

(75) Inventors: Bang Won Lee, Yongin (KR); Jong Taek Kwak, Yongin (KR)

(73) Assignees: Samsung Electro-Mechanics Co., Ltd. (KR); ATLab Inc. (KR)

( * ) Notice: Subject to any disclaimer, the term of this patent is extended or adjusted under 35 U.S.C. 154(b) by 732 days.

(21) Appl. No.: 10/411,094

(22) Filed: Apr. 11, 2003

(65) Prior Publication Data

US 2003/0193529 A1 Oct. 16, 2003
US 2005/0060668 A9 Mar. 17, 2005

(30) Foreign Application Priority Data

Apr. 12, 2002 (KR) ............ 10-2002-0020132
Apr. 12, 2002 (KR) ............ 10-2002-0020133

(51) Int. Cl.
*G09G 5/00* (2006.01)
(52) U.S. Cl. ............ 345/166; 345/157; 345/163
(58) Field of Classification Search .......... 345/156, 345/157, 163, 166; 250/206.1, 557; 382/107, 382/205, 274, 278
See application file for complete search history.

(56) References Cited

U.S. PATENT DOCUMENTS

| | | | | |
|---|---|---|---|---|
| 5,644,139 | A * | 7/1997 | Allen et al. ............ | 250/557 |
| 6,281,882 | B1 * | 8/2001 | Gordon et al. ............ | 345/166 |
| 6,411,652 | B1 * | 6/2002 | Sivan ............ | 375/240.16 |
| 6,664,948 | B2 * | 12/2003 | Crane et al. ............ | 345/166 |
| 6,823,077 | B2 * | 11/2004 | Dietz et al. ............ | 382/107 |
| 7,151,561 | B2 * | 12/2006 | Lin et al. ............ | 348/208.1 |
| 7,446,756 | B2 * | 11/2008 | Brosnan et al. ............ | 345/166 |
| 2003/0012281 | A1 * | 1/2003 | Cho et al. ............ | 375/240.16 |
| 2006/0062306 | A1 * | 3/2006 | Ha et al. ............ | 375/240.16 |

OTHER PUBLICATIONS

German Patent and Trademark Office Office Action; Nov. 24, 2006 All references cited in the Search Report are listed above.

* cited by examiner

*Primary Examiner*—Sumati Lefkowitz
*Assistant Examiner*—Seokyun Moon
(74) *Attorney, Agent, or Firm*—Cantor Colburn LLP

(57) ABSTRACT

Disclosed are a navigation system and a navigation method, wherein the navigation method comprises the steps of sequentially providing image frames containing navigation information and generating electric signals corresponding to a position of an optical sensor, storing a first image frame into a reference frame memory as a reference frame, storing an input image frame subsequent to the first image frame into an input frame memory as a current input frame, setting a mask window having a predetermined size on the reference frame, obtaining correlation values over all the pixels on the current input frame by a full search comparison method, by moving the mask window on the current input frame pixel by pixel, calculating X-axis and Y-axis displacements of a pixel having the greatest correlation value of all the pixels, and updating the reference frame using the current input frame stored in the input frame memory.

The navigation system and the navigation method in accordance with the present invention may change input frame selection period based on movement speed of an optical mouse, so that it is possible to detect movement of an optical mouse without changing sampling speed of an optical sensor even when an optical mouse moves fast. Further, the navigation system and the navigation method in accordance with the present invention may consume low power in comparison with a conventional navigation system and method, and reduce noises existed in an optical mouse.

1 Claim, 6 Drawing Sheets

Reference Frame

Sample Frame
(Currently Input Frame)

NAVIGATION SYSTEM AND NAVIGATION METHOD

BACKGROUND OF THE INVENTION

1. Field of the Invention

The present invention relates to a navigation system and a navigation method, and more particularly to a navigation system and a navigation method capable of changing input frame selection period based on movement speed of an optical mouse, wherein pixel mapping is performed by comparing all the pixels in a current input frame with all the pixels in a reference frame.

2. Description of the Related Art

The operation of an optical mouse is will be described below with reference to FIG. 1. Referring to FIG. 1, light beams 7 emitted from an illuminating source 8 are incident onto a worktable and are reflected at the surface 2 of the worktable. The reflected light beams 6 pass through a lens 5 and are incident onto an optical sensor implemented by a semiconductor chip. The optical sensor 3 continuously captures images formed on the surface of the worktable and then the captured images are stored in a memory device (not shown). A currently captured image (a current input image) and a precedently captured image (a preceding input image) stored in the memory device are compared with each other and correlation values therebetween are obtained. Then, displacement of the optical mouse is calculated with the correlation values and transmitted to a computer system.

A conventional navigation method is disclosed in U.S. Pat. No. 5,644,139, which is issued to Allen et al. under a title "NAVIGATION TECHNIQUE FOR DETECTING MOVEMENT OF NAVIGATION SENSORS RELATIVE TO AN OBJECT". Referring to FIG. 2, a conventional pixel mapping method for obtaining correlation values between a current input frame and a reference frame will be described below.

First, a reference frame data is obtained, and then a current input frame data is obtained. Then, the correlation values between the reference frame data and the current input frame data are calculated. Each pixel on the reference frame is compared with its corresponding pixel and eight pixels around the corresponding pixel on the current input frame, and it is determined whether the current input frame is moved by one pixel from the reference frame. As a result, in the case that the current input frame is moved from the reference frame by one pixel, displacement with respect to such movement is obtained. Then, a reference frame is newly set by moving the old reference frame to the matched pixel. Since such conventional pixel mapping is targeted to detect movement or displacement within one pixel in nine directions, if an optical mouse moves by more than one pixel in one sampling period, the optical mouse cannot trace the movement of the optical mouse and therefore generates an error. To prevent such a movement trace error, the movement detection is achieved by increasing sampling speed of input frames. However, there is a limitation to increase electrical speed of an optical sensor. This conventional method is disadvantageous in additional power consumption and noise increase.

Further, the conventional method is disadvantageous in that the conventional navigation system consumes a great amount of power and causes a big noise because input frame selection period is maintained constant even if movement speed of an optical mouse is changed.

SUMMARY OF THE INVENTION

It is a feature of an embodiment of the present invention to provide a navigation system and a navigation method capable of correctly detecting movement of an optical system without increasing sampling speed when an optical mouse moves fast.

It is a feature of an embodiment of the present invention to provide a navigation system and a navigation method capable of changing input frame selection period based on movement speed of an optical mouse.

It is a feature of an embodiment of the present invention to provide a navigation system that consumes a small amount of power and has good noise reduction characteristic.

In accordance with one aspect of the present invention, there is provided a navigation method comprising the steps of sequentially providing frames containing navigation information and generating electric signals corresponding to a position of an optical sensor, storing a first frame into a reference frame memory as a reference frame, storing an input frame subsequent to the first frame into an input frame memory as a current input frame, setting a mask window having a predetermined size on the reference frame, obtaining correlation values over all the pixels on the input frame by a full search comparison method, by moving the mask window on the input frame pixel by pixel, calculating X-axis and Y-axis displacements of a pixel having the greatest correlation value of all the pixels, and updating the reference frame using the current input frame stored in the input frame memory.

In accordance with another aspect of the present invention, there is provided a navigation method comprising the steps of sequentially providing frames containing navigation information and generating an electrical signal representing a position of an optical sensor, storing a first frame into a reference frame memory as a reference frame, storing input frames subsequent to the first frame into an input frame memory as a current input frame, setting a mask window having a predetermined size on the reference frame, obtaining correlation values by a full search comparison process with respect to all over the input frame, moving the mask window on the input frame pixel by pixel, calculating X-axis and Y-axis displacements with respect to a pixel having the greatest correlation value, determining movement speed of the optical sensor and selecting input frame selection period based on the movement speed of the optical sensor, and updating the reference frame using the current input frame stored in the input frame memory.

In accordance with further another aspect of the present invention, there is provided a navigation system comprising an optical sensor for receiving light beams reflected at a surface of a worktable, an A/D converter for receiving analog signals from the optical sensor and converting the analog signals to digital signals, an input frame memory for storing image data which is an output of the A/D converter therein, a reference frame memory for storing a preceding input frame stored in the input frame memory as a reference frame after receiving the preceding input frame from the input frame memory, a processor for setting a mask window with respect to the reference frame, controlling a full search window with respect to the input frame stored in the input frame memory, receiving a current input frame data and the reference frame data from the input frame memory and the reference frame memory, respectively, and obtaining correlation values between the reference frame data and the current input frame data by comparing the reference frame data with the current input frame data, and a displacement detecting circuit for detecting displacement values, by receiving outputs of the processor.

In accordance still further another aspect of the present invention, there is provided a navigation system comprising an optical sensor for receiving light beams reflected at a surface of a worktable, an A/D converter for receiving analog signals from the optical sensor and converting the analog signals to digital signals, an input frame memory for storing image data which is an output of the A/D converter therein, a reference frame memory for storing a preceding input frame stored in the input frame memory as a reference frame after receiving the preceding input frame from the input frame memory, a processor for setting a mask window with respect to the reference frame, controlling a full search window with respect to the input frame stored in the input frame memory, receiving a current input frame data and the reference frame data from the input frame memory and the reference frame memory, respectively, and obtaining correlation values between the reference frame data and the current input frame data by comparing the reference frame data with the current input frame data, a displacement detecting circuit for detecting displacement values by receiving outputs of the processor, and a sample control circuit for determining input frame selection period and transmitting it to the input frame memory.

BRIEF DESCRIPTION OF THE DRAWINGS

The above and other features and advantages of the present invention will become readily apparent to those of ordinary skill in the art by describing in detail preferred embodiments thereof with reference to the attached drawings in which.

DETAILED DESCRIPTION OF THE INVENTION

Figure 1:
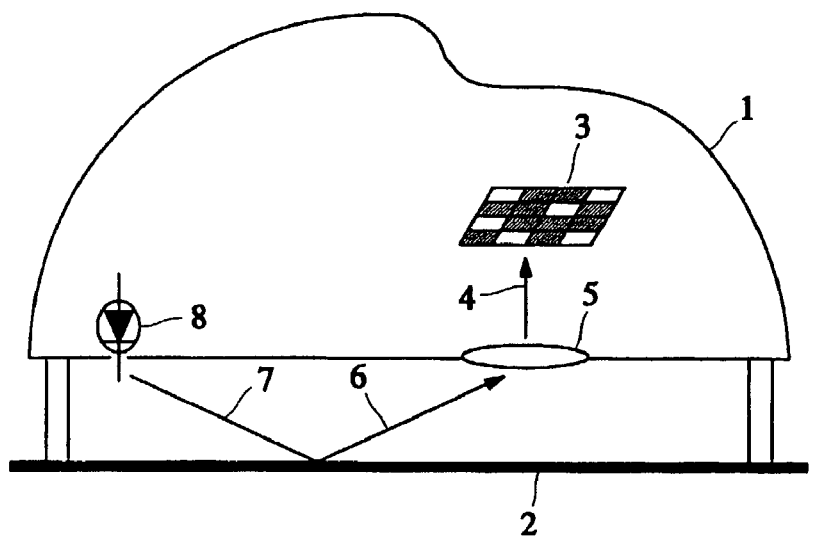
FIG. 1 is a schematic view of an optical mouse in accordance with the conventional art.
Figure 2:
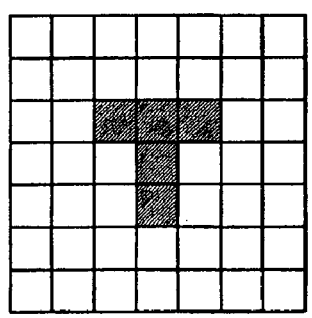
FIG. 2 is a schematic view showing a pixel mapping method for obtaining correlation values between a reference frame and a current input frame (sample frame) in accordance with the conventional art.
Figure 2:
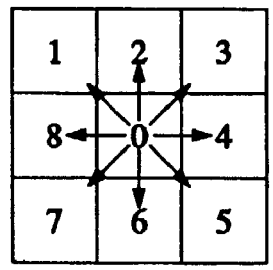
Figure 2:
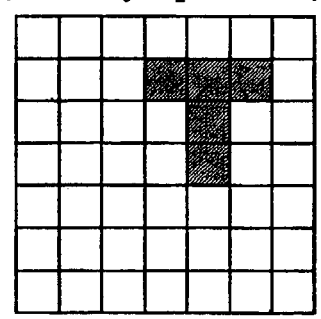

Korean Patent Application No. 2002-20132 and 2002-20133, filed on Apr. 12, 2002, and entitled: "Navigation Method and Navigation System," is incorporated by reference herein in its entirety.

Hereinafter, the present invention will be described in detail by describing preferred embodiments of the present invention with reference to the accompanying drawings. Like reference numerals refer to like elements throughout the drawings.

Figure 3:
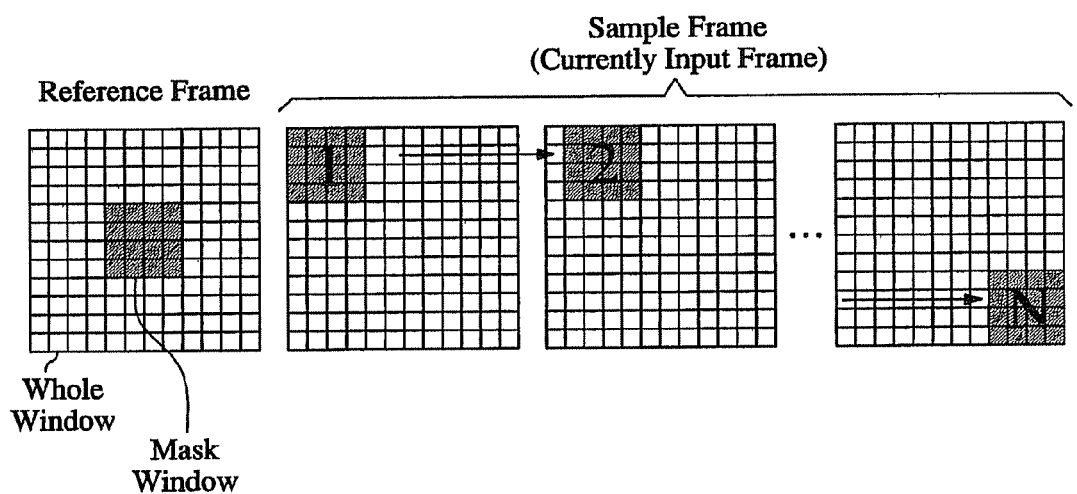
FIG. 3 is a schematic view showing a pixel mapping method for obtaining correlation values between a reference frame and a current input frame in accordance with the present invention.

FIG. 3 illustrates a pixel mapping method for obtaining correlation values between a reference frame and a current input frame.

Movement of an optical mouse is detected by comparing pixels on a current input frame and pixels on a subsequent input frame, wherein the input frames are input at predetermined intervals. A preceding input frame serves as a reference frame and a mask window is set on a portion of the reference frame. Then, the mask window and a subsequent input frame are compared with each other. At this time, a full search comparison is performed. That is, each pixel on the mask window is not compared with most adjacent pixels pixel by pixel, but all the pixels on the reference frame are compared with all the pixels on the subsequent input frame mask window by mask window. For example, with reference to FIG. 3, a preceding input frame (a reference frame) comprises 12×12 pixels and a mask window comprising 4×4 pixels is set on a portion of the reference frame comprising 12×12 pixels. The mask window moves pixel by pixel on a current input frame comprising 12×12 pixels, and compared with the current input frame in a way of full search comparison to obtain correlation values. That is, first, a mask window on the reference frame is compared with a first area on the current input frame or the sample frame, and a first correlation value is obtained. Then, the mask window on the reference frame is compared with a second area on the current input frame, and a second correlation value is obtained. Such comparison is repeated until the mask window on the reference frame is compared with a last area N on the current input frame. Then, X-axis and Y-axis displacements are generated with respect to a position where the correlation value is greatest. The displacements range from (0,0) which is obtained when an optical mouse never move to (n,n) which is obtained when an optical mouse moves widely. The maximum displacements "n" is determined by a size of a mask window on a reference frame and a full search window of an input frame, and is expressed as an equation, n=(a size of full search window−a size of mask window)/2. The obtained displacements, which denote moving distance of an optical sensor, are transmitted to a controller in a computer system and used as a movement value of a cursor on a computer screen.

Figure 4:
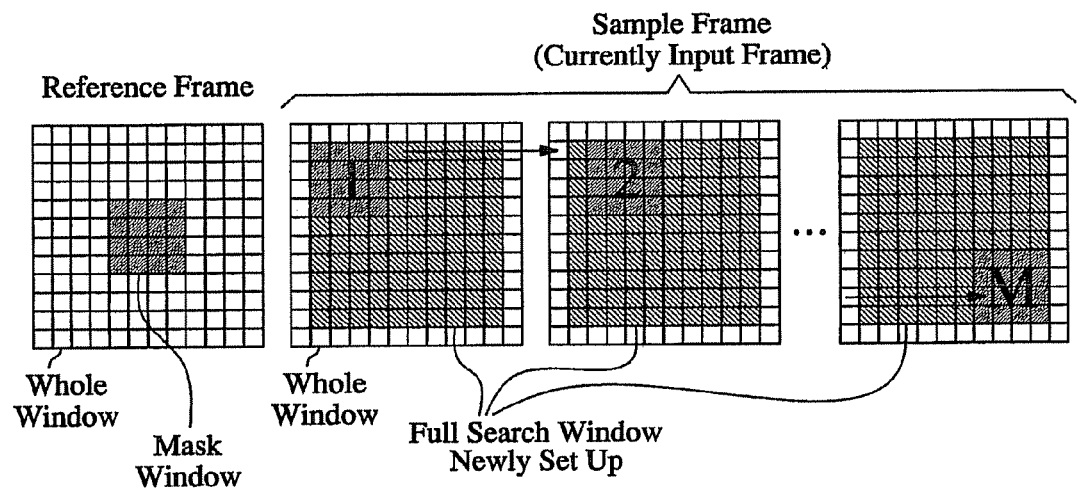
FIG. 4 is a schematic view showing a pixel mapping method for obtaining correlation value between a reference frame and a current input frame when a search area is set, in accordance with the present invention.

FIG. 4 illustrates a pixel mapping method for obtaining correlation values between a current input frame and a reference frame when a search area is set. In FIG. 4, in obtaining correlation values between a sample frame (a current input frame) and a mask window on a reference frame, full search comparison is not performed all over the sample frame but is performed over a portion of the sample frame. Out of newly set full search windows of the sample frame, a first area is compared with the reference frame and a first correlation value is obtained. Next, a second area of the sample frame is compared with the reference frame and a second correlation value is obtained. Such comparison is repeated until the last area M is compared with the reference frame and a last correlation value is obtained. However, in the case that lighting is lopsided and light is not incident at one side or in the case that a sample frame is defected at a peripheral area thereof, correlation values with respect to the peripheral area of the sample frame may be incorrect. Accordingly, in such cases, movement of an optical mouse is detected by eliminating a predetermined portion of the sample frame using the navigation method shown in FIG. 4.

Figure 5:
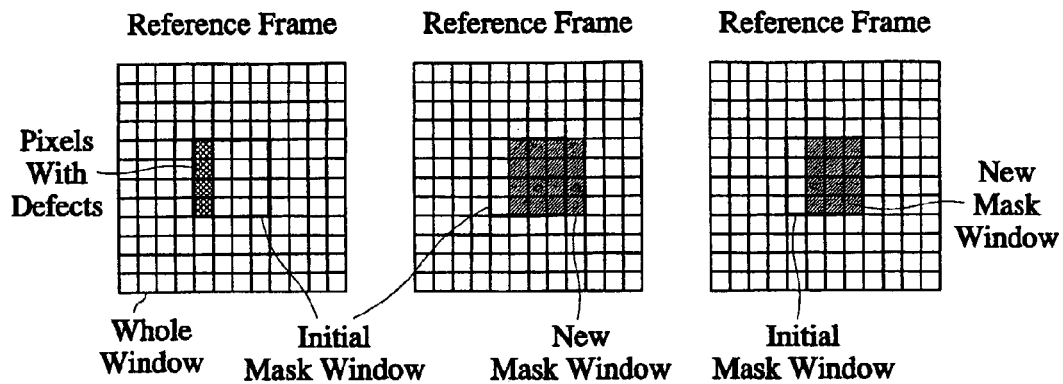
FIG. 5 is a schematic view showing a method for modifying a mask window when an initial mask window on a reference frame has a defect.

FIG. 5 illustrates a method for changing a mask window in the case that an initial mask window of a reference frame has a defect. When an initial mask window has a defected pixel therein, the mask window is differently set from the initial mask window by shifting the initial mask window in a direction on the reference frame, or reducing the size of the mask window to exclude the defected pixel from the initial mask window.

Figure 6:
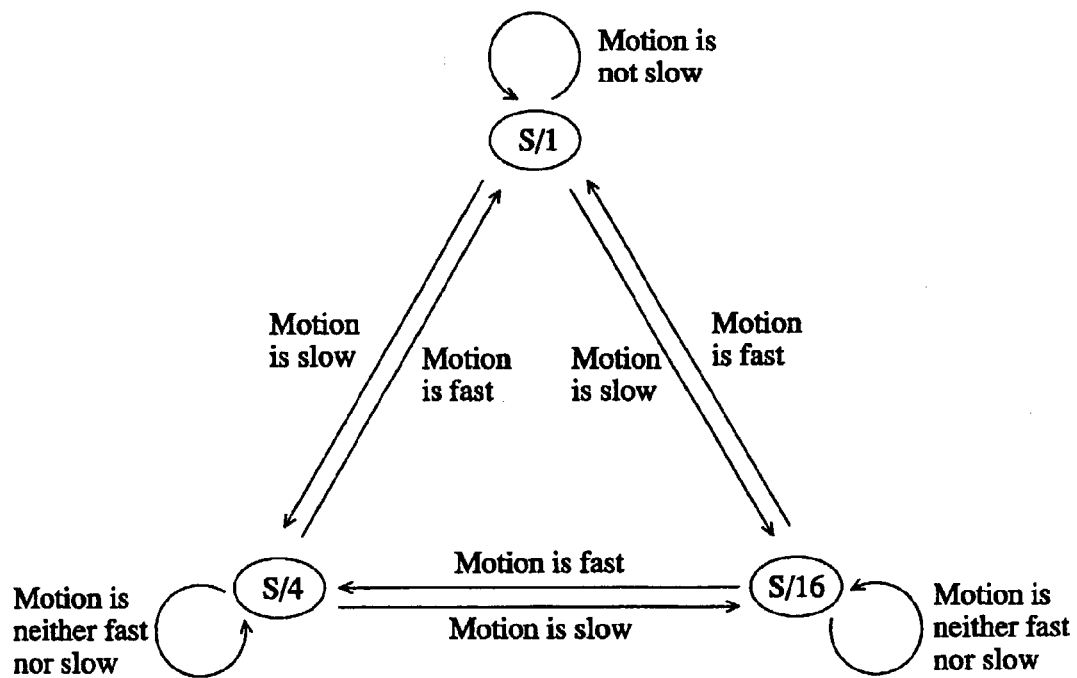
FIG. 6 is a state diagram showing a method for changing input frame selection period.

FIG. 6 illustrates a state diagram to change input frame selection periods. Movement detection of an optical mouse is determined by correlation values between a reference frame and an input frame. The reference frame is not fixed as set once. As an optical mouse moves, image frames are continuously input and therefore the reference frame is continuously updated using a preceding input frame. The update of the reference frame is accomplished by receiving a current input frame when an optical mouse moves and replacing the old reference frame with the current input frame. The update of the reference frame is not performed whenever the movement of an optical mouse is detected but performed at regular intervals, i.e. based on sampling period. The sampling period is changed based on the movement speed of an optical mouse, i.e. displacement values of X-axis and Y-axis.

At state S/1, if it is determined that the movement of an optical mouse is slower than that of a preceding state, input frame selection period is lowered and state S/1 changes to state S/4. At state S/4, if the movement of an optical mouse is still slow, state S/4 changes to state S/16. At state S/4, if movement of an optical mouse is faster than that of a preceding state, the state S/4 changes to S/1 state in which sampling period is short. Further, at state S/16, if movement of an optical mouse becomes faster, then the state S/16 changes to the sate S/4. Still further, at state S/16, if movement of an optical mouse becomes more faster, the state S/16 changes to state S/4, and finally reaches to state S/1. However, at state S/16, the movement of an optical mouse is neither fast nor slow, state S/16 is maintained.

Figure 7:
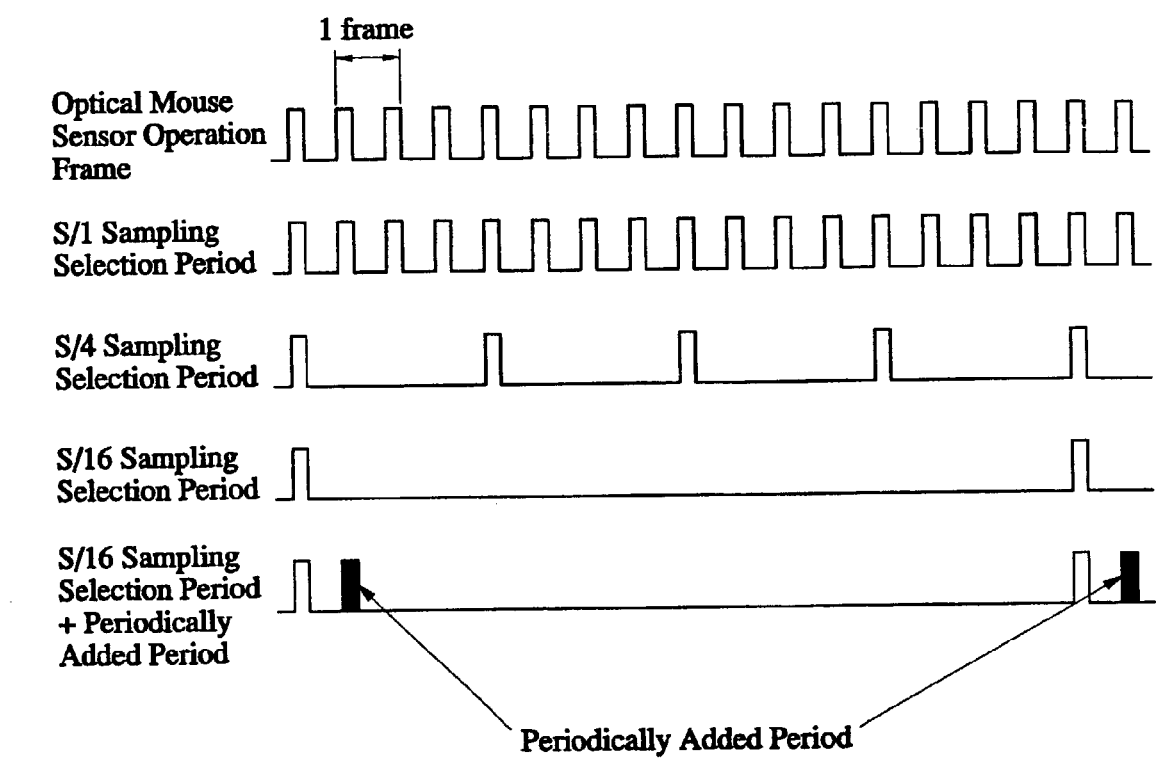
FIG. 7 is a timing diagram for explaining a process of determining sampling period of input frames.

FIG. 7 is a timing diagram for explaining a method for determining the sampling selection of input frame, i.e. reference frame updating period. As shown in FIG. 4, the sampling selection period at state S/4 is four times greater than that of state S/1, and sampling selection period at state S/16 is four times greater than that of state S/4.

An optical sensor receives an input frame data at predetermined intervals during the sampling period. Accordingly, if an optical sensor moves fast, a reference frame is updated at S/1 state sampling period. Further, if movement of an optical sensor becomes slow, a reference frame is updated at S/4 state sampling period. Further, an optical sensor moves more slowly, a reference frame is updated at S/16 sate sampling period. On the other hand, when an optical sensor operates at the predetermined periodic sampling period, movement error may be caused. Accordingly, to reduce such movement error of an optical sensor, the input frame data must be additionally obtained. As shown in FIG. 7, an additional periodic pulse is needed to obtain such additional input frame data. x As described above, if input frame selection period varies, frame rates vary too according to the movement of the optical sensor. Accordingly, even an optical sensor moves slowly or fast repeatedly, such movement of the optical sensor is precisely detected.

Figure 8:
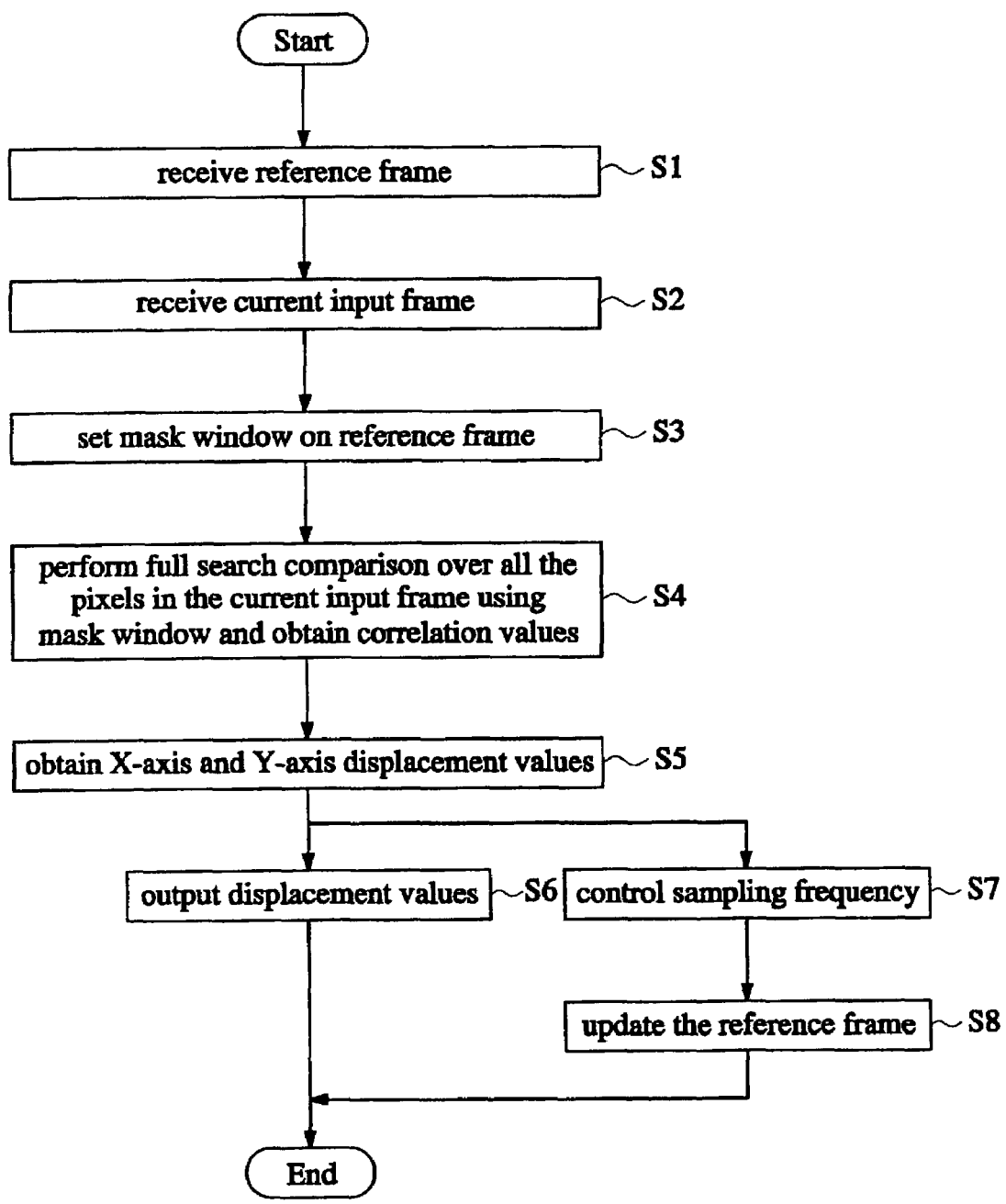
FIG. 8 is a flow chart showing a navigation method.

FIG. 8 illustrates a flow chart showing a navigation method.

Referring to FIG. 8, a first image frame generated at an initial stage is saved in a reference frame memory as a reference frame during step S1.

Subsequent input frames are continuously saved in an input frame memory during step S2. A mask window having a predetermined size is set on the reference frame during step S3. The mask window moves pixel by pixel on the input frame for full search comparison and correlation values with respect to each pixel are obtained during step S4. At a position where the correlation value is greatest, X-axis and Y-axis displacement values are obtained during step S5 and the displacement values are output during step S6. Next, it is determined that movement of an optical sensor is fast or slow and a sampling period is controlled by monitoring a sampling period of the preceding input frame during step S7. The reference frame is updated using the input frame during step S8.

Figure 9:
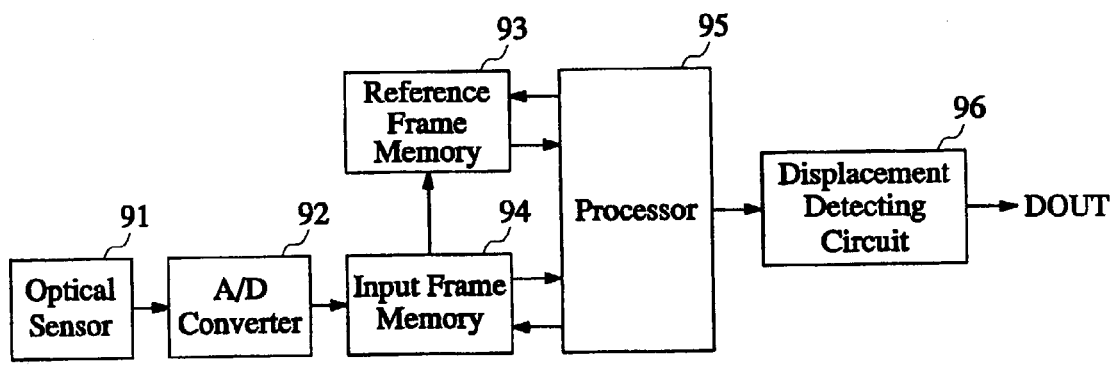
FIG. 9 is a block diagram showing a navigation system in accordance with one embodiment of the present invention.

FIG. 9 is a block diagram of a navigation system in accordance with one embodiment of the present invention. Referring to FIG. 9, a navigation system comprises an optical sensor 91 receiving light beams reflected at the surface of a worktable (not shown), and A/D converter 92 for converting analog signals to digital signals, an input frame memory 94 for storing image data which are output of the A/D converter 92, a reference frame memory 93 for receiving and storing a preceding input frame data stored in the input frame memory 94, a processor 95 for setting a mask window with respect to the reference frame stored in the reference frame memory 93, controlling a full search window with respect to the input frame stored in the input frame memory 94, receiving the reference frame data and the input frame data from the reference frame memory 93 and the input frame memory 94, respectively, and calculating their correlation values by comparing the reference frame data and the input frame data, and a displacement detecting circuit 96 for detecting displacement value DOUT by receiving the output of the processor 95.

The operation of the navigation system shown in FIG. 9 will be described below.

Light beams emitted from a photo diode (not shown) are incident onto a worktable (not shown) and are reflected at the surface of the worktable. The reflected light beams are input to an optical sensor 91 by passing through a lens (not shown). The optical sensor 91 transmits an image data to an A/D converter 94, and the image data is converted to digital signals. The digital signals are then saved in an input frame memory 94 as a current input frame data and then the current input frame data saved in the input frame memory 94 is transmitted to a reference frame memory 93 and saved in the reference frame memory 93 as a reference frame data. The reference frame data stored in the reference frame memory 93 is continuously updated using the current input frame stored in the input frame memory 94. The processor 95 receives the reference frame data from the reference frame memory 93, receives the current input frame from the input frame memory 94, compares the reference frame data and the current input frame data, and obtains their correlation values. The processor 95 sets a mask window on the reference frame stored in the reference frame memory 93 and controls a full search window on the input frame stored in the input frame memory 94. The displacement detecting circuit 96 receives the correlation values from the processor 95, detects X-axis and Y-axis displacements and transmits them to a controller in a computer system, so that a cursor moves by the displacements on a computer screen.

Figure 10:
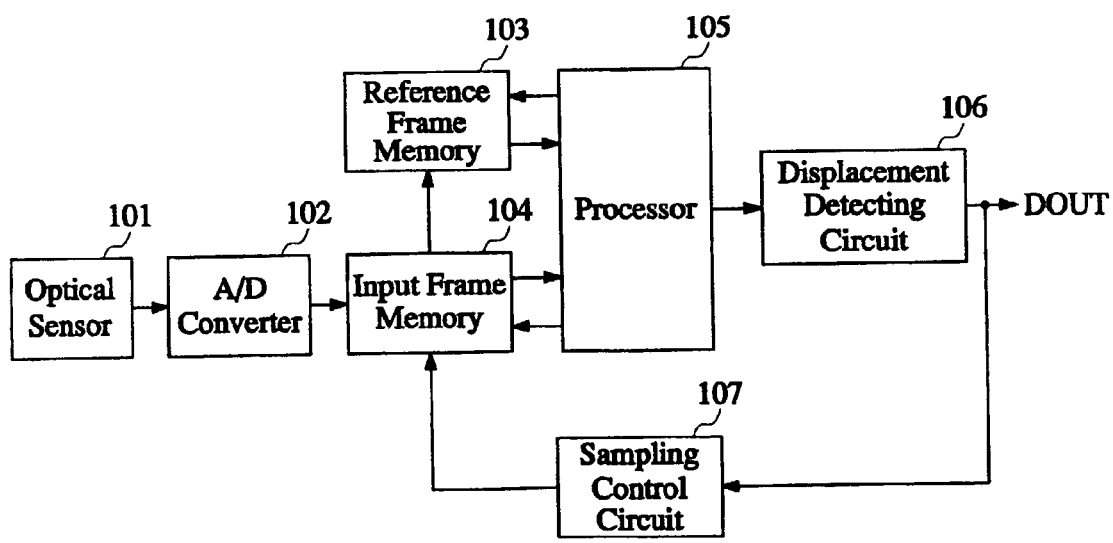
FIG. 10 is a block diagram showing a navigation system in accordance with another embodiment of the present invention.

FIG. 10 is a block diagram of a navigation system in accordance with another embodiment of the present invention. Referring to FIG. 10, a navigation system comprises an optical sensor 101, an A/D converter 102 for converting analog signals to digital signals, an input frame memory 104 for storing image data output from the AND converter 102 therein, a reference frame memory 103 for storing a preceding input frame data stored in the input frame memory 104, a processor 105 for setting a mask windows with respect to the reference frame stored in the reference frame memory 103, controlling a full search window with respect to the input frame stored in the input frame memory 104, receiving the reference frame data and the input frame data from the reference frame memory 103 and the input frame memory 104, respectively, and obtaining correlation values by comparing the reference frame data and the input frame data, a displacement detecting circuit 106 for detecting displacement by receiving the output of the processor 105, and a controller 107 for determining input frame selection period.

The operation of the navigation system shown in FIG. 10 will be described below.

Light beams emitted from an illuminating source (not shown) are incident onto a worktable (not shown) and are reflected at the surface of the worktable. The reflected light beams are input to an optical sensor 101, passing through a lens (not shown). The optical sensor 101 transmits an analog image data to an A/D converter 104, and the analog image data is converted to digital signal image data. The digital signal image data are then saved in an input frame memory 104 as an input frame data and then the input frame data saved in the input frame memory 104 is transmitted to a reference frame memory 103 and saved in the reference frame memory 103 as a reference frame data. The reference frame data in the reference frame memory 103 is continuously updated by the current input frame data in the input frame memory 104. The processor 105 receives the reference frame data from the reference frame memory 103, receives the current input frame from the input frame memory 104, compares the reference frame data and the current input frame data, and calculates correlation values. The processor 105 sets a mask window with respect to the reference frame stored in the reference frame memory 103 and controls a full search window with respect to the input frame stored in the input frame memory 104. The displacement detecting circuit 106 receives the correlation values from the processor 105, detects X-axis and Y-axis displacements. The displacements are transmitted to a controller in a computer system, so that a cursor moves by the displacements on a computer screen. The sample control circuit 107 detects whether an optical mouse moves fast or slow, and determines input frame selection period based on the movement speed of the optical mouse, while monitoring the selection period of the preceding input frame.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A navigation method comprising the steps of:
sequentially providing frames containing navigation information and generating electric signals representing a position of an optical sensor;
storing a first frame into a reference frame memory as a reference frame;
storing an input frame subsequent to the first frame into an input frame memory as a current input frame;
setting a predetermined region of the reference frame as a mask window;
obtaining correlation values over all the pixels on the input frame by a full search comparison method, by moving the mask window on the input frame pixel by pixel;
calculating X-axis and Y-axis displacements of a pixel having the greatest correlation value of all the pixels; and
updating the reference frame using the current input frame stored in the input frame memory,
wherein the mask window includes at least two pixels and the size of mask window is n×m, wherein n and m are natural numbers, and the size of the input frame is i×j, wherein i and j are natural numbers, where n is less than i by at least three pixels and m is less than j by at least three pixels,
wherein when the mask window has a defect, an area different from the area of the mask window or a small area in the mask window where the defect portion is excepted is newly set as a mask window on the reference frame.

* * * * *